United States Patent Office 3,772,270
Patented Nov. 13, 1973

3,772,270
ERYTHROMYCYLAMINE AND ERYTHROMYCYL B AMINE
Koert Gerzon and Hubert W. Murphy, Indianapolis, Ind., assignors to Eli Lilly and Company, Indianapolis, Ind.
No Drawing. Continuation-in-part of abandoned application Ser. No. 756,292, Aug. 29, 1968. This application Nov. 21, 1969, Ser. No. 878,936
Int. Cl. C07c 129/18
U.S. Cl. 260—210 E                                    6 Claims

ABSTRACT OF THE DISCLOSURE

Erythromycylamine and erythromycyl B amine are prepared by the hydrogenation of the oxime, the hydrazine adduct or the N-isopropylidene derivative of the hydrazine adduct of erythromycin or of erythromycin B using a noble metal catalyst. Erythromycylamine and erythromycyl B amine are antibiotically active both in vitro and in vivo and not only enjoy an increased stability towards acid, but also demonstrate a lower incidence of side effects when administered in vivo as compared with erythromycin itself.

CROSS-REFERENCE

This application is a continuation-in-part of our copending application, Ser. No. 756,292, filed Aug. 29, 1968, and now abandoned.

BACKGROUND OF THE INVENTION

The name "erythromycylamine" is in the prior art. Gerzon et al., J. Am. Chem. Soc., 78, 6396, footnote 3 (1956), stated that a future publication would deal with the investigation of erythromycylamine produced by reductive amination of erythromycin. Djokic and co-workers have also stated in several publications [Tetrahedron Letters, 1645 (1967), Croatica Chemica Acta, 39, 273 (1967) and Great Britain Pat. 1,100,504, published Jan. 24, 1968] that erythromycylamine is produced by the reduction of erythromycin oxime by sodium borohydride. Neither of the above procedures yields authentic erythromycylamine. Reductive amination of erythromycin yields a product of unknown structure, and treatment of erythromycin oxime (as the hydrochloride salt) with sodium borohydride yields only purified erythromycin oxime.

Erythromycin, the parent antibiotic from which erythromycylamine can be prepared, is chiefly effective against gram-positive organisms. The chemical structure and the stereochemistry of erythromycin have been well established [see Wiley, Gerzon, Flynn, Sigal, Weaver, Quarck, Chauvette and Monahan, J. Am. Chem. Soc., 79, 6062 (1957)]. While erythromycin has been widely used clinically for a number of years, the chief usage has been in the form of certain erythromycin derivatives or insoluble salts such as propionyl erythromycin or erythromycin stearate. Erythromycin itself suffers from the disadvantage of having the ability to increase intestinal motility in some humans, particularly when administered by the oral route. The use of erythromycin in the form of its esters or special salts is in part necessitated by the instability of the antibiotic itself in acidic media such as encountered in the stomach on oral administration. Erythromycin B is described in U.S. Pat. 2,806,024 issued Sept. 10, 1957.

It is an object of this invention to provide erythromycin and erythromycin B derivatives which are as active microbiologically as erythromycin or erythromycin B, but which do not have associated with their use certain of the drawbacks which accompany the use of the parent antibiotics.

SUMMARY OF THE INVENTION

This invention provides the novel antibiotic amines, erythromycylamine and erythromycyl B amine, prepared by the hydrogenation of the oxime or the hydrazine adduct or the N'-isopropylidene derivative of the hydrazine adduct of either erythromycin or erythromycin B. The amines (IIIa and IIIb) are prepared from erythromycin (Ia) or erythromycin B (Ib) as indicated in the following reaction sequence.

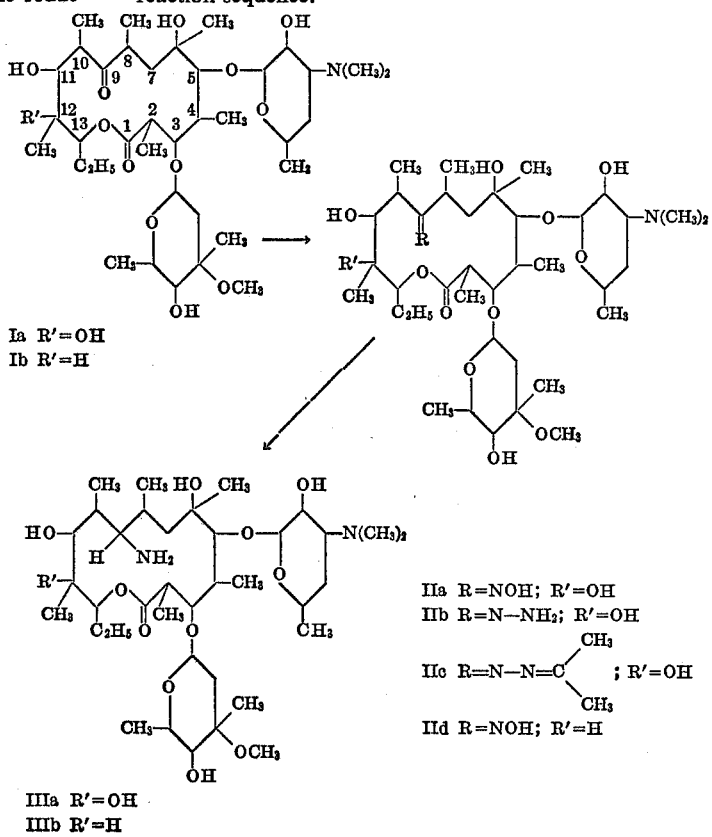

Transformation of erythromycin (Ia) to either erythromycin oxime (IIa) or erythromycin-hydrazine adduct (IIb) is accomplished by reacting erythromycin with hydroxylamine hydrochloride or hydrazine, respectively, in methanol or other suitable solvent. The N'-isopropylidene derivative (IIc) of the erythromycin-hydrazine adduct is prepared by reacting the adduct (IIb) with acetone. Hydrogenation of erythromycin oxime, of erythromycin-hydrazine adduct or of the N'-isopropylidene derivative of erythromycin-hydrazine adduct in the presence of a noble metal catalyst produces erythromycylamine (IIIa) in good yield. The hydrogenation is carried out either in a high pressure hydrogenation bomb at pressures in the range 500–2000 p.s.i. or, in the case of the isopropylidene derivative of erythromycin-hydrazine adduct, at low pressure, and at temperatures ranging upwards from room temperature to about 100° C. An inert solvent is used to moderate the reaction. Among such inert solvents are acidic solvents such as acetic acid. We prefer, however, to employ water as a solvent, said water containing 1–2 percent of δ-gluconolactone, glucoheptonolactone or other suitable lactone of a sugar acid. Noble metal catalysts which are useful in the reaction include platinum, palladium, rhodium, ruthenium and the like, either as the free metal or preferably as the oxide.

Erythromycyl B amine (IIIb) is conveniently prepared by reduction of the oxime (IId) employing a noble metal catalyst and an acidic medium. Methods employed in the preparation of erythromycylamine are readily adaptable to the preparation of erythromycyl B amine.

Erythromycylamine and erythromycyl B amine are isolated from the hydrogenation mixture by conventional procedures after filtration of the catalyst. Erythromycylamine is a white crystalline solid, melting at 125–127° C. after recrystallization from ether. Erythromycylamine thus prepared is a single spot material by thin layer chromatography using 25 percent dimethylformamide in methanol as the eluant and silica F as the adsorbent. In this system, the compound has an $R_f$ equal to 0.20. Electrometric titration in 66 percent DMF reveals a $pK_a$ of 9.8 for the newly generated primary amino group in addition to the known $pK_a$ of 8.7 for the dimethylamino group of the desosamine moiety. The presence of a primary amine group is authentically demonstrated by treating erythromycylamine in methanol solution with acetic anhydride, thus converting it to the corresponding acetamide which has highly characteristic infrared adsorption bands at 1525 cm.$^{-1}$ and 1660 cm.$^{-1}$. The mass spectrum of erythromycylamine reveals a molecular ion with a m/e value of 734 (calcd. molecular weight=734.7).

*Analysis.*—Calcd. (percent): C, 60.46; H, 9.60; N, 3.01. Found (percent): C, 60.50; H, 9.73; N, 3.78.

Erythromycyl B amine is a white amorphous solid having a $pK_a$ in DMF of 9.7 for the newly generated primary amino group and at 8.3 for the dimethylamino group already present. Mass Spectrographic Data reveals a molecular ion with a m/e value of 718 (calcd. molecular weight=718.95).

*Analysis.*—Calcd. (percent): C, 61.80; H, 9.81; N, 3.89. Found (percent): C, 61.63; H, 10.33; N, 4.35.

The above data all support the conclusion that the compounds formed in the reduction are 9S - amino-9-dihydro erythromycin and 9S-amino-9-deoxy-9-dihydro erythromycin B with a stereochemical configuration and conformation as indicated in the formula:

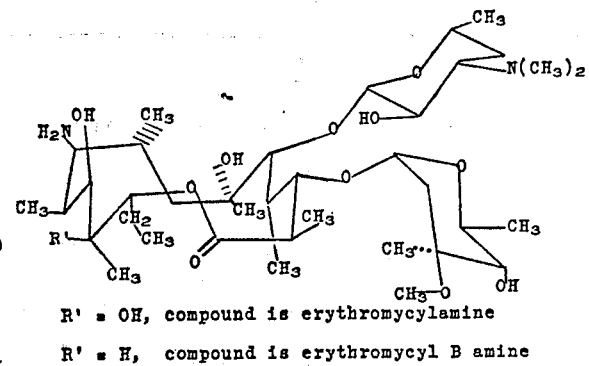

R' = OH, compound is erythromycylamine

R' = H, compound is erythromycyl B amine

An inspection of the data of Djokic et al., Croatica Chemica Acta, 39, 273 (Table II on page 276) and a comparison of that data with the above data obtained for erythromyclamine, reveals that the compound alleged by them to be "erythromycylamine" is in fact erythromycin oxime.

Erythromycylamine has pronounced antibiotic activity of the order of magnitude of the parent antibiotic. It is orally effective in the treatment of mice infected with various gram-positive organisms. Table I which follows gives evidence of the in vivo antibiotic activity of erythromycylamine. In Table I, column 1 gives the name of the organism used to infect the mice, column 2 the $ED_{50}$ (dose which cures 50 percent of infected animals) for erythromycylamine in mg./kg.×2 when administered by the subcutaneous route, and column 3 the same information for administration by the oral route.

TABLE I

| Organism | $ED_{50}$ mg./kg.×2 | |
| --- | --- | --- |
| | Subcutaneous | Oral |
| S. pyogenes | 2.6 | 26 |
| S. aureus | 10.4 | 93 |
| D. pneumonia | 10.4 | 62.3 |

Erythromycylamine is thus as active as propionyl erythromycin or as erythromycin base in combating the infections caused by S. pyogenes and is unexpectedly more effective than either against S. aureus and D. pneumonia. These data indicate that erythromycylamine as such is antibacterially active; that is, chemical or enzymatic changes are not required to convert erythromycylamine to an antibiotically active form.

Erythromycylamine and erythromycyl B amine are effective in vitro against both gram-negative and gram-positive bacteria. Table II below gives the in vitro antibiotic spectrum of erythromycylamine as determined by the disc plate method using trypticase soy agar as the culture medium. In Table II, column 1 gives the name of the test organism; column 2, the minimum inhibitory concentration (MIC) in mcg. per ml. at which erythromycylamine inhibits the growth of the organism of column 1; and column 3, similar information for erythromycin (in the form of the glucoheptonate salt).

TABLE II

| Organism | MIC in mcg./ml. for— | |
| --- | --- | --- |
| | Erythromycylamine | Erythromycin glucoheptonate |
| Pseudomonas sp. X-239 | 100 | 50 |
| E. coli EC-0127 | 6.25 | 12.5 |
| E. coli EC-14 | 6.25 | 12.5 |
| Proteus sp. (Indole−) PR-6 | 25 | 50 |
| Proteus sp. (Indole+) PR-9 | 100 | 100 |
| K. aerobacter K-1 | 6.25 | 25 |
| K. aerobacter KA-14 | 3.13 | 6.25 |
| S. aureus PS-3055 | .2 | .2 |
| S. aureus MR-3130 | 3.13 | 1.56 |
| S. typhimurjum S-4 | 6.25 | 25 |
| S. typhosa T-36 | 6.25 | 25 |
| Salmonella sp. SA-12 | 6.25 | 12.5 |
| Shigella sp. SH-3 | 3.13 | 12.5 |

Erythromycyl B amine also has marked inhibitory activity in vitro against a variety of organisms: *S. aureus* PS–3055, *B. subtitis* ATCC 6633, *Sarcina lutea* PCI 1001, *Mycobacterium avium* ATCC 7992, *Salmonella galinarium*, and *E. coli* ATCC 4157. The magnitude of the growth inhibition of the above organisms produced by erythromycyl B amine is comparable to that produced by erythromycylamine.

As disclosed above, both erythromycyl B amine and erythromycylamine have antibiotic activity against both gram-positive and gram-negative organisms. Thus, erythromycylamine and erythromycyl B amine can be used to control the population of staphylococci or streptococci present on equipment, furnishings, walls and floors in dental and medical offices and in hospitals. For such use, the antibiotic amine is dissolved in water, preferably in the form of an acid addition salt such as the hydrochloride, and usually with the addition of a surface active agent, and the solution applied to the surfaces as an ordinary wash solution. In addition, the erythromyclamines of this invention can be used for treating infections in mammals caused by various microorganisms, and when so used, the methods employed for the administration of erythromycin, its salts and derivatives to both animals and man can be adapted directly for the use of erythromycylamine or erythromycyl B amine; that is to say, the erythromycylamines can be used to treat infections caused by pathogenic microorganisms such as the staphylococci, pneumococci, streptococci (including hemolytic streptococci) and also strains of Neisseria, Hemphilus, Corynebacterium, Brucella and Clostridium. When employed to treat infections in mammals, erythromycylamine and erythromycyl B amine can be administered in dosages ranging from 0.5 to 2 g. per day in divided dosages.

Erythromycylamine or erythromycyl B amine are administered to mammals usually by the oral route either in the form of capsules or tablets, either of which pharmaceutical forms can be prepared by the methods used to prepare similar pharmaceutical forms for erythromycin itself.

The advantage of employing the erythromycylamines particularly erythromycylamine itself rather than erythromycin lies not only in the fact that they are virtually devoid of any tendency to induce abnormal liver function, but also in the fact that they cause little or no increase in intestinal motility.

The lessened degree of intestinal motility of erythromycylamine as compared with erythromycin is illustrated by the following experiment in which erythromycin and erythromycylamine were administered to dogs with permanently implanted induction coils on the walls of the gut. In Table III, column 1 gives the dosage of antibiotic employed; column 2, the route of administration; columns 3 and 4 the severity of the reaction to erythromycin; column 5 the number of dogs tested with erythromycin who vomited over the number tested; columns 6 and 7 the extent and severity of the reaction to administration of erythromycylamine and column 8 the number which vomited over the number tested.

TABLE III

| Dose in mg./kg. | Route | Erythromycin | | | Erthromycylamine | | |
|---|---|---|---|---|---|---|---|
| | | Severity | Duration | Vomiting | Severity | Duration | Vomiting |
| 10 | Oral | +++ | 2 hr. | 3/3 | + | | 0/6 |
| 2–4 | IV | +++ | | 1/2 | | | |
| 5–8 | IV | | | | 0 | | 0/3 |

The above results indicate that erythromycylamine is not nearly as irritating to the gut as is erythromycin itself.

Erythromycylamine is also more stable toward acid than is erythromycin. This increased stability is demonstrated by the experiemntal exposure of erythromycylamine to pooled human gastric juice (pH=1.2). In Table IV, the first column gives the name of the antibiotic under test, column 2, the percent of the antibiotic remaining after 5 minutes exposure to pooled human gastric juice, and column 3, the amount remaining after 10 minutes exposure.

Table IV

| | 5' | 10' |
|---|---|---|
| Erythromycin | 3 | (*) |
| Erythromycylamine | 67 | 47 |

*Not measured.

As seen from these figures, erythromycylamine survives considerably longer than does erythromycin under acidic conditions. The same increased acid stability is also characteristic of erythromycyl B amine.

The following specific examples more fully illustrate the nature and scope of the process of this invention.

Example I

Eight grams of erythromycin oxime were suspended in 350 ml. of an aqueous solution containing 4.2 g. of δ-gluconolactone. 2.5 g. of platinum oxide were added and the mixture subjected to hydrogen atmosphere at 700 p.s.i. for 16 hours at about 28° C. in a hydrogenation bomb. The reaction mixture was removed from the hydrogenation bomb, and the catalyst separated by filtration. 25 ml. of 1 N aqueous sodium hydroxide were added to the filtrate which was then extracted 4 times with 100 ml. of methylene chloride. The organic layers were combined and dried, and the solvent removed by evaporation in vacuo. Recrystallization of the residue from ether yielded 5.5 g. (71 percent yield) of white crystalline erythromycylamine melting at about 125° C.

Salts of erythromycin oxime such as the bicarbonate or thiocyanate can be hydrogenated under similar conditions to yield erythromycylamine.

Example II

The process of Example I was carried out except that the erythromycin-hydrazine adduct, prepared according to Sigal et al., J. Am. Chem. Soc., 78, 3881 (1956), was hydrogenated in glacial acetic acid. Filtration of the catalyst and removal of the solvent in vacuo yielded a residue which was dissolved in ether. The ethereal solution was washed with 10 percent sodium hydroxide and with water and was then dried. Concentration and cooling of the solution yielded erythromycylamine.

Example III

The erythromycin-hydrazine adduct was dissolved in acetone and allowed to stand for about 4 hours at room temperature. Upon cooling the N'-isopropylidene derivative of erythromycin-hydrazine adduct was obtained in crystalline form melting at 145–147° C. The compound was isolated by filtration. The crystalline material proved to be single spot material on thin layer chromatography. Electrometric titration data, X-ray diffraction data, and spectral data, including both infrared and ultraviolet, characterized the compound as having the desired structure.

*Analysis.*—Calcd. (percent): C, 60.96; H, 9.34; N, 5.33. Found (percent): C, 60.99; H, 9.46; N, 5.20.

Forty grams of the N'-isopropylidene derivative of erythromycin-hydrazine adduct were dissolved in 150 ml. of glacial acetic acid and hydrogenated at a hydrogen pressure of 60 p.s.i. for 40 hours at 28° C. in the presence of $PtO_2$. The reduction proceeded through the intermediate formation of a dihydro derivative, the N'-isopropyl derivative of the erythromycin-hydrazine adduct. Erythromycylamine was isolated from the reaction mixture and purified by the process of Example II.

Example IV

The N'-isopropyl derivative of erythromycin-hydrazine adduct was isolated from a hydrogenation of the corresponding N'-isopropylidene compound in ethanol using $PtO_2$ as a catalyst. The catalyst was separated by filtration. Evaporation of the filtrate in vacuo gave a residue which was crystallized from isopropanol to yield the N'-isopropyl derivative of erythromycin-hydrazine adduct melting at about 130° C.

*Analysis.*—Calcd. (percent): C, 60.80; H, 9.57; N, 5.32. Found (percent): C, 60.44; H, 9.56; N, 5.58.

Reduction of the above compound by the procedure of Example III yields erythromycylamine which is isolated and purified by the procedure of that example.

Example V

A reaction mixture was prepared containing 10 g. of erythromycin B, 4.8 g. of hydroxylamine hydrochloride, 8.1 g. of barium carbonate and 50 ml. of methanol. The reaction mixture was heated to reflux overnight with stirring. 250 ml. of methanol were added and the resulting mixture filtered to remove inorganic material. Evaporation of the filtrate to dryness yielded a residue containing erythromycin B oxime. The residue was dissolved in chloroform, the chloroform solution washed successively with 10 percent sodium carbonate and water and then separated and dried. Evaporation of the chloroform solvent yielded purified erythromycin B oxime.

Eight grams of erythromycin B oxime, prepared as above, were dissolved in 100 ml. of glacial acetic acid and the mixture hydrogenated at 700 p.s.i. for 18 hours using 3 g. of platinum oxide as a catalyst. The catalyst was removed by filtration, and the acetic acid was removed by evaporation in vacuo. The residue, containing erythromycyl B amine formed in the above reaction, was dissolved in water. Gradient pH extraction of the aqueous solution with methylene chloride at pH=5.0, 6.0, 7.0 and 7.5 yielded erythromycin B on evaporation of the solvent whereas fractions taken at pH=8.0, 8.5, and 9.0 yielded erythromycyl B amine on evaporation of the solvent.

We claim:
1. A compound of the formula:

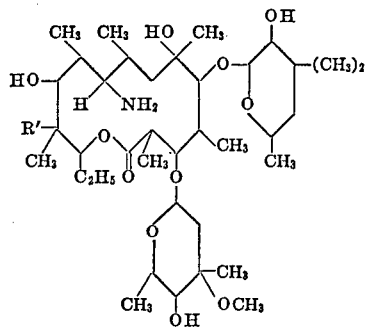

wherein R' is H or OH.

2. 9-amino-3-O-cladinosyl- 5 - O - desosaminyl-6,11,12-trihydroxy-2,4,6,8,10,12 - hexamethylpentadecane-13-olide of the formula:

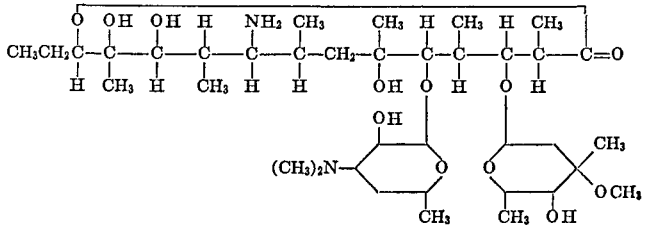

3. A process for preparing erythromycylamine or erythromycyl B amine which comprises hydrogenating compound of the formula:

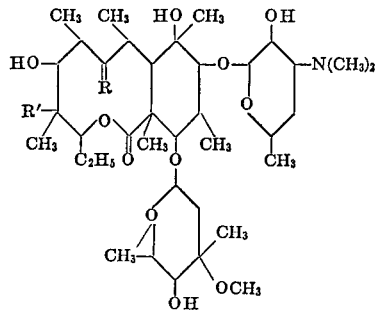

wherein R is =NOH, =N—$NH_2$ or =N—N=C($CH_3$)$_2$ and R' is H or OH, at a hydrogen pressure in the range 50–2000 p.s.i. in the presence of an inert solvent and a noble metal catalyst.

4. A process according to claim 3, in which erythromycin oxime or erythromycin B oxime is hydrogenated in aqueous solution containing 1–2 percent of δ-gluconolactone in the presence of platinum oxide as a catalyst.

5. N'-isopropylidene derivative of erythromycin-hydrazine adduct.

6. N'-isopropyl derivative of erythromycin-hydrazine adduct.

References Cited
UNITED STATES PATENTS
3,458,577   7/1969   Galantay _____ 260—566 A
3,478,014   11/1969  Djokic et al. _____ 260—210 E LEWIS GOTTS, Primary Examiner
J. R. BROWN, Assistant Examiner U.S. Cl. X.R.
424—180